United States Patent [19]

Settlemier et al.

[11] Patent Number: 5,035,395

[45] Date of Patent: Jul. 30, 1991

[54] SUPPORT CRADLE FOR LOAD EQUALIZATION

[75] Inventors: Brock R. Settlemier, Piedmont; Steven R. Bone, Walnut Creek; John Tolivaisa, Pacifica; James E. Nugent, Walnut Creek, all of Calif.

[73] Assignee: Bigge Crane and Rigging Co., San Leandro, Calif.

[21] Appl. No.: 451,217

[22] Filed: Dec. 15, 1989

[51] Int. Cl.⁵ .......................................... F16M 13/00
[52] U.S. Cl. .................................. 248/634; 248/632; 248/638; 248/188.2; 248/630
[58] Field of Search ............... 248/634, 632, 630, 678, 248/638, 188.2, 180, 346, 649

[56] References Cited

U.S. PATENT DOCUMENTS

| 1,094,589 | 4/1914 | Poland | 248/632 X |
| 1,873,009 | 8/1932 | Miller, Jr. et al. | 248/632 X |
| 2,357,126 | 8/1944 | Kuebert et al. | 248/632 |
| 2,661,943 | 12/1953 | Wilbur | 248/632 X |
| 2,932,122 | 4/1966 | Matter | 248/649 X |
| 3,306,562 | 2/1967 | Bellefleur | 248/649 X |
| 4,408,930 | 10/1983 | Ninet et al. | 248/632 X |
| 4,846,435 | 7/1989 | Cohen | 248/346 |

FOREIGN PATENT DOCUMENTS 2516129 10/1976 Fed. Rep. of Germany ... 248/188.2

Primary Examiner—Alvin C. Chin-Shue
Attorney, Agent, or Firm—Bruce & McCoy

[57] ABSTRACT

A support cradle for load equalization including a crib containing fabreeka material mounted on a lower base member and a piston disposed on the lower side of the upper load supporting member whereby the piston fits in the crib to carry the load on the fabreeka.

5 Claims, 3 Drawing Sheets

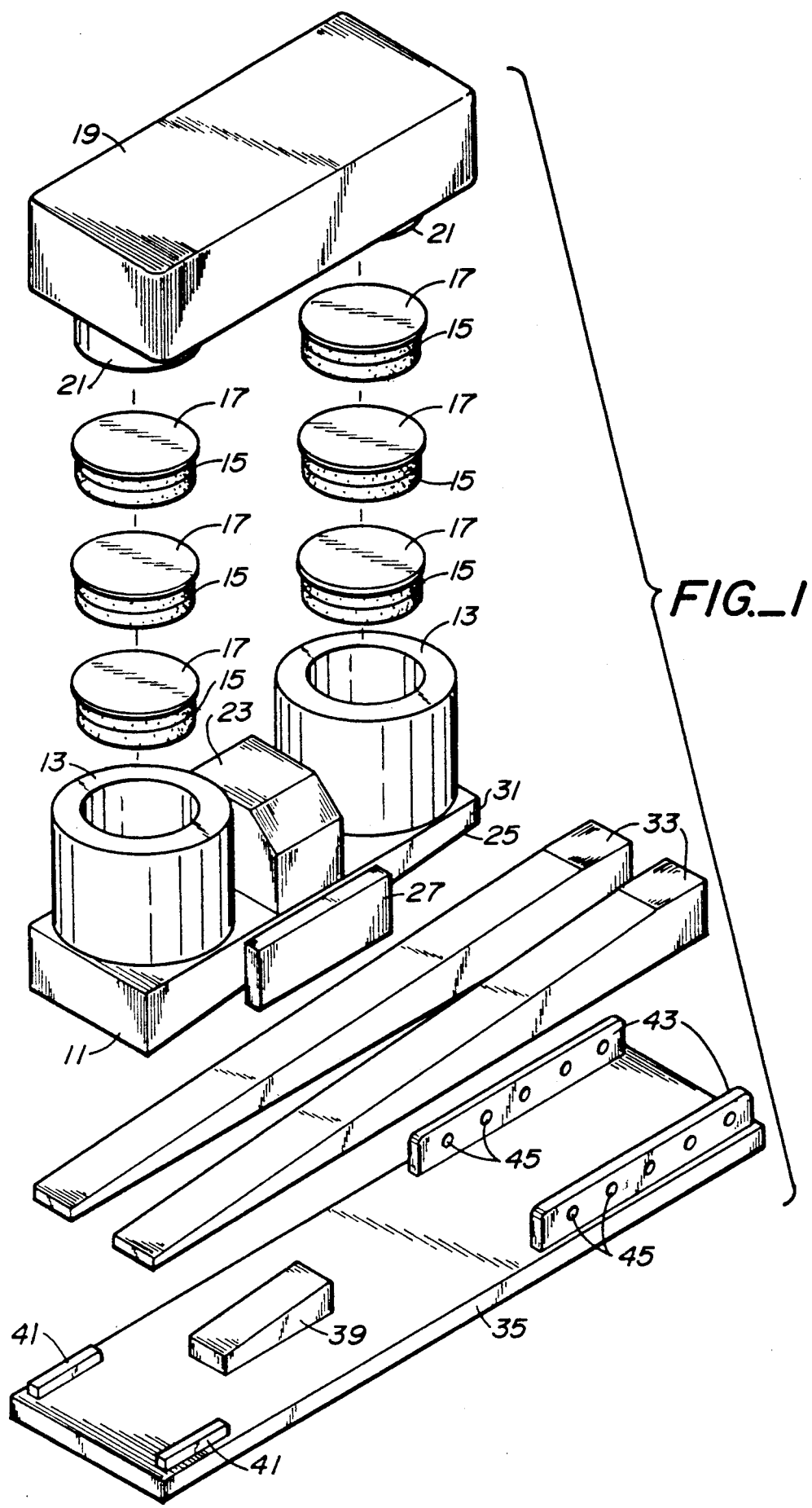
FIG._1

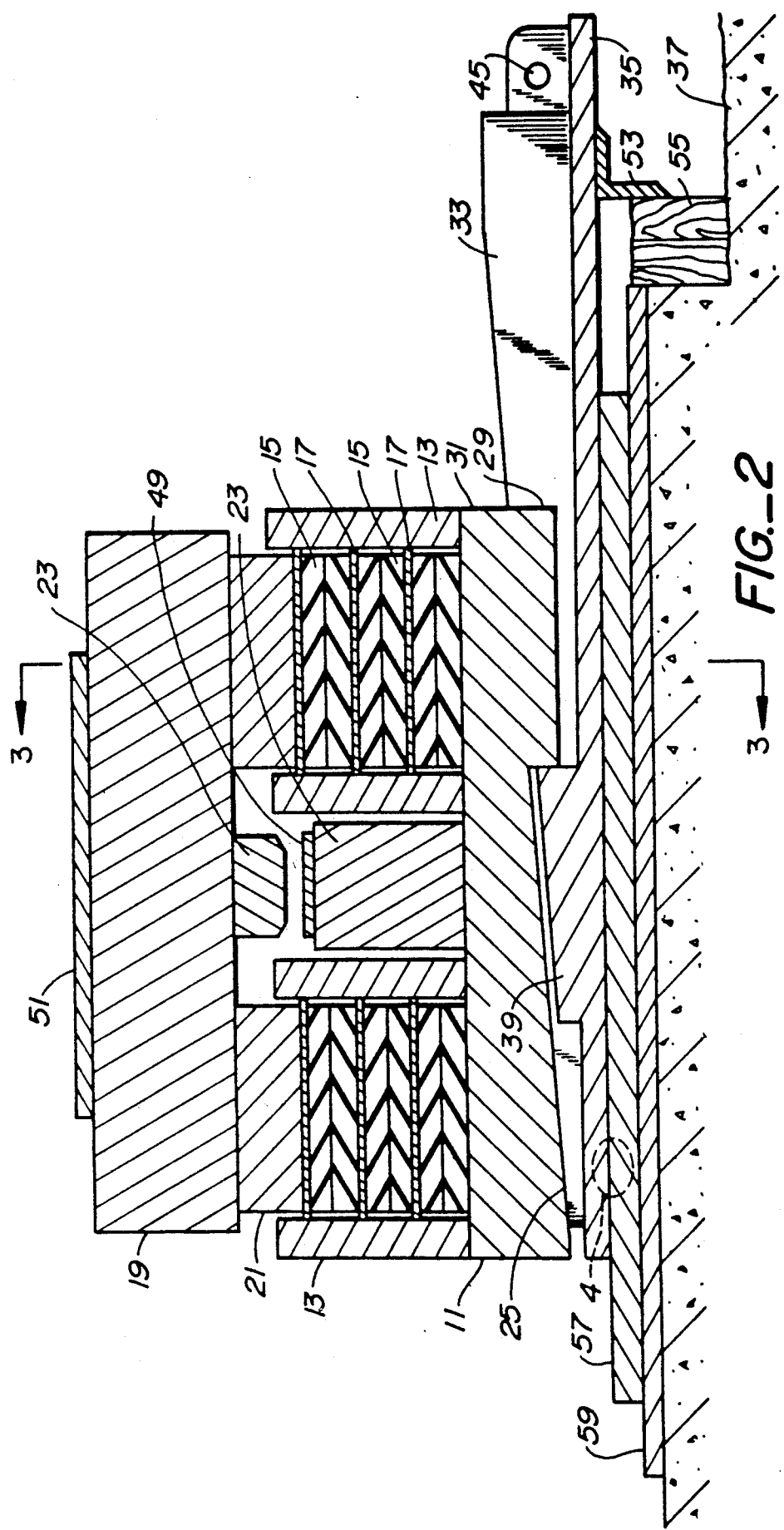
FIG._2

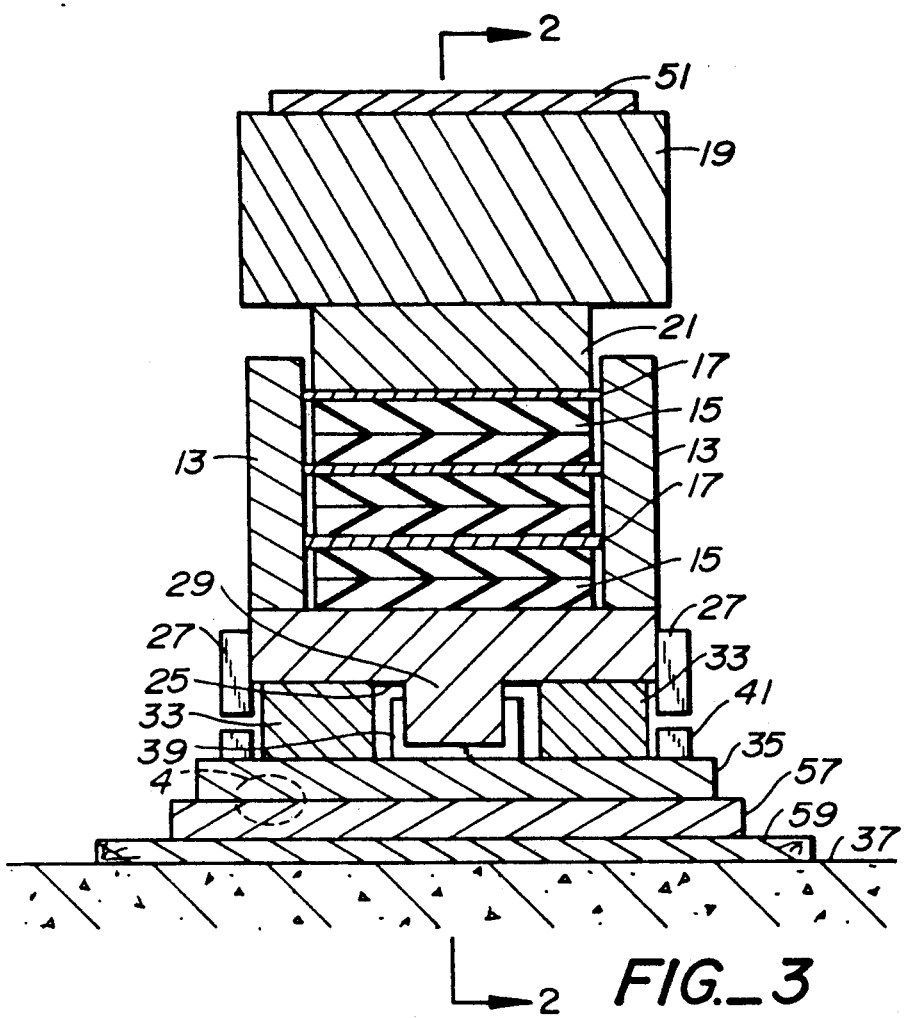
FIG._3
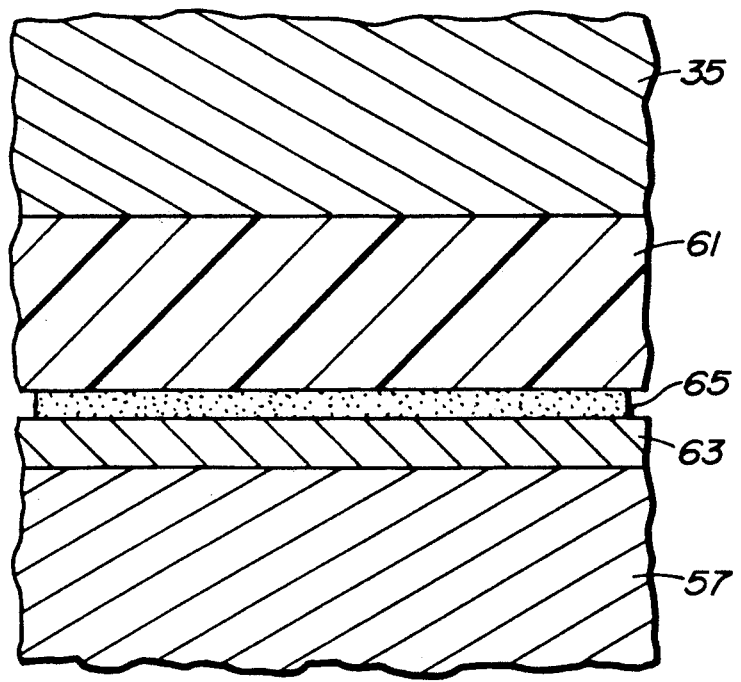
FIG._4

SUPPORT CRADLE FOR LOAD EQUALIZATION

CROSS-REFERENCE TO RELATED APPLICATION

The present invention is related to the copending patent application for a method for dismantling a natural gas holder filed concurrently herewith.

BACKGROUND OF THE INVENTION

1. FIELD OF THE INVENTION

The present invention relates to passive load support devices and more particularly it relates to a passive load support cradle having a semi-active constituent in its construction which allows load equalization when a number of similar cradles are utilized for supporting a load. Still more particularly, the cradles of the present invention are used in multiples to support the weight of large structures as they are being disassembled from the bottom while the load of the structure is alternately lifted by jacks and then supported by the cradles.

2. DESCRIPTION OF THE PRIOR ART

The present invention was designed for use during the dismantling of large gas holders weighing in excess of 3,000 tons. The gas holders are in the form of a vertical cylinder approximately 400 feet high and 250 feet in diameter supported by a multiplicity of columns disposed around the periphery of the enclosure shell. The dismantling procedure consists of lifting the gas holder enclosure by hydraulic jacks disposed at every other one of the support columns. The alternate columns are cut off at the bottom along with a portion of the adjacent shell of the gas holder enclosure so the jacks can be fitted under the columns to lift the weight of the holder. When the holder has been lifted, the remaining alternate columns are cut off slightly higher than the height of the support cradles of the present invention whereby the holder structure can be lowered onto the cradles disposed at every other column around the gas holder between the jacks. These cradles then carry the load until the support columns and adjacent enclosure shell where each of the jacks are disposed can be further cut away, approximately the extension length of the jacks, and the jacks reactivated to again lift the structure. Then, the columns, and adjacent enclosure shell at each of the support cradles and the lower periphery of the gas holder is removed approximately equal to the amount of the stroke of the jacks. The jacks are then lowered the length of their stroke until the holder again rests on the cradles. The process can be repeated until the whole gas holder has been disassembled from the bottom and the remaining structure has been lowered close enough to the ground whereby it can be dismantled by other means.

The problem that needed to be solved occurs when the tank is lowered by the jacks onto the support cradles. With the heavy weight and inexact methods utilized to cut off the bottoms of the columns, it is necessary to provide a means whereby it can be assured that each of the support cradles is carrying nearly an equal share of the weight of the whole tank and performs its function of supporting one of the columns. If the columns are cut off by acetylene gas torches resulting an uneven surfaces, the problem is exacerbated. It is necessary to provide a cradle which can accommodate a possibly uneven cut without the necessity of accurately machining the bottom of each of the cut off columns before proceeding to lower the load onto the cradles.

In view of this unique engineering problem, there is no known prior art to the cradles of the present invention except for completely passive, inert support blocks.

SUMMARY OF THE INVENTION

The present invention is a support cradle for load equalization. It includes a lower base member having at least one crib secured thereto with at least one layer of elastomeric material disposed in the crib with the lateral edges of the material constrained by the crib when said material is put under compression. A load bearing upper member is formed for cooperating with the base member and has a piston secured thereto formed for fitting into the crib in close fitting relation for bearing on the elastomeric layer.

OBJECTS OF THE INVENTION

It is therefore an important object of the present invention to provide a support cradle which has a semi-active member in its construction which allows a load to be imposed thereon whereby when a multiplicity of cradles are utilized to support the load, the load is equalized on the different cradles.

It is another object of the present invention to provide a cradle for supporting a load which allows for unevenness in the lower surface of the supported member whereby the load is distributed among a multiplicity of cribs having elastomeric load absorbing materials constrained therein which equalize the load among the multiplicity of cribs.

And it is yet a further object of the present invention to provide a unique active element construction for a load supporting cradle.

Other objects and advantages of the present invention will become apparent when the apparatus of the present invention is considered in conjunction with the accompanying drawings.

DESCRIPTION OF THE DRAWINGS

FIG. 1 is a perspective exploded view of a preferred embodiment of the support cradle of the present invention;

FIG. 2 is a cross section in side elevation of the support cradle of FIG. 1;

FIG. 3 is an end elevation in cross section of FIG. 2 taken along lines 3—3 of FIG. 2; and FIG. 4 is a broken out enlarged view of the layer of materials denoted in FIGS. 2 and 3.

DESCRIPTION OF THE PREFERRED EMBODIMENT

Reference is made to the drawings for a description of the preferred embodiment of the present invention wherein like reference numbers represent like elements on corresponding views.

FIG. 1 illustrates the elements of a preferred embodiment of the present invention. There shown is a base member 11 having at least one crib 13 secured thereto. In the preferred embodiment, a pair of cribs are utilized which are disposed in spaced relation at opposite ends of the base member. Additional cribs could be utilized with three being particularly advantageous for providing three-point suspension and with four being the optimum for the largest load-carrying capacity in the smallest space. Each of the cribs has at least one layer of elastomeric material 15 disposed in the crib, and the crib constrains the lateral or peripheral edges of the material when the material is put under compression. In the preferred embodiment, the constraining cribs are hollow cylinders made from lengths of steel tube for the greatest strength, ease of manufacture, and lowest cost. For the particular application described in the preceding description of the prior art, sections of 12-inch outside diameter steel tube having a 1¼-inch wall thickness is used.

In the preferred embodiment, fabreeka is utilized as the elastomeric material 15. Fabreeka is a manufactured material composed of layers of tightly twisted, closely woven, light weight duck with each layer being impregnated with a special elastomeric compound containing mold and mildew inhibiting agents. The physical properties of fabreeka were designed for the reduction of impact shock, vibration, and structure-borne noise. The material is a commercially available product manufactured by Fabreeka Products Co., Inc. It will withstand loads between 10,000 and 20,000 psi before breakdown depending upon the size and thickness of the pad. When it is constrained within a crib, the load deflection curve is non-linear and therefore its compressive modulus varies with the load. In the same manner, its static spring rate varies with the loading. It has a high damping value of about four times that of natural rubber and 100 times that of steel. It has a hardness which combined with its limited compressibility affords a great degree of stability. It has a large dielectric strength and electrical resistivity, and is impervious to most oils and is resistant to the effects of steam, water, mildew and brine, as well as continuous temperature exposures between plus 200 and minus 65 degrees fahrenheit. It is sold in pads and molded shapes.

In the preferred embodiment, a multiple of layers of fabreeka 15 are utilized in the cribs 13 and are employed in a multiple of assemblies. Each assembly includes two layers of inch-thick fabreeka secured together with adhesive which in turn are secured to a metal plate 17. Three such assemblies per crib are utilized for the particular application described in the prior art. The metal plates are machined to closely fit inside the cribs and facilitate the distribution of pressure throughout the fabreeka compression assembly and act as separators within the crib enclosure. The fabreeka layers are smaller in diameter than the cribs so that the peripheral edges are spaced slightly from the walls of the cribs until the layers are compressed and expand in diameter until they contact the walls of the cribs.

The load bearing upper member 19 has one or more pistons 21 secured thereto formed for fitting into each crib 13 in a closely fitting male/female relation. The load bearing upper member and the lower base member 11 are steel bars with the former being made out of 6-inch plate, 13 inches wide by 28 inches long for the described application. Each piston is designed to transmit the load from the upper load bearing member to the fabreeka layers 15. The upper load bearing member and the lower base member are provided with safety blocks 23 which are secured to each respectively and formed for preventing excessive loading of the fabreeka by limiting the penetration of the pistons of the load bearing member into the cribs of the base member.

The preferred embodiment of the present invention also includes wedge means which are utilized for lifting the cradles vertically to engage the load they are to support and for preloading the cradle and the fabreeka. The wedge means includes a tapered surface 25 formed on the bottom surface of the lower base member 11 with guide means in the form of plates 27 which are secured to the edges thereof proximate the center of the base member. In the preferred embodiment, the wedge means also includes a first center guide 29 secured to the bottom surface of the base member at the thinner end thereof 31 and a pair of elongated independent wedges 33 which in use are driven under the base member 11 on both sides of the center guide means 29 between the edge guides 27.

A wedge guide or receiver plate 35 is also utilized which is placed on the support base which is a concrete pad 37 for the support columns of the gas holder. It is a solid support surface on which the cradle is placed. The wedge guide plate also includes a second center guide/divider 39 and two pair of edge guides 41, 43 disposed at opposite ends of the guide plate. The second center guide is disposed in the middle of the wedge guide plate so that it contacts the first center guide 29 on the bottom of the lower base member 11 when the two are engaged in close opposed proximity before the wedges 33 are driven into position under the base member on the wedge guide plate. The engagement of the center guides prevents the lower base member moving with the wedges on the wedge guide plate when wedges are forced under the lower base member (See FIG. 2). The rear of the two pair of edge guides 43, where the wedges are inserted, are also provided with locking means or wedge retainers to prevent wedge retraction movement. In the preferred embodiment, the locking means includes holes 45 formed in the rear edge guides 43 so that locking bars 47 can be inserted behind the wedges 33 after they have been driven in under the base member 11 so that the wedges do not slip backwards on the wedge guide plate 35 and are retained therein.

FIG. 2 illustrates in cross section the preferred embodiment of the cradle of the present invention. More readily observable from that view is the location and assembly of the upper load bearing plate 19 with its pistons 21 which project downward into the cribs 13 mounted on the base member. Also more visible are the safety blocks 23 which are disposed between the cribs and which contact each other before the fabreeka 15 is overloaded. The ultimate loading of the fabreeka in the cribs can be controlled by placing different thickness spacers 49 between the safety blocks. A brass plate 51 is disposed on top of the load bearing member to engage the rough surfaces of the support column I beam lower end after it has been cut off. It can also be seen that the wedge guide plate 35 is provided with a depending anchor 53 which stops it from moving on the support surface 37 while the wedges 33 are being driven in underneath the cradle from right to left. The anchor positions the wedge guide plate by the insertion of blocks 55 or spacers between the anchor 53 and the concrete support base 37 which supports the load.

Breakouts for FIG. 4 shown in FIGS. 2 and 3 and disclose a load centering means which is utilized for the cradle. It includes a flat steel plate 57 which is disposed underneath the wedge guide plate 35 and is mounted on top of a plywood pad 59 which is mounted on the concrete base support 37. The plywood pad absorbs imperfections and unevenness in the top surface of the support base. The two plates 37, 57 are separated by a sheet of ultra high molecular weight polyethylene 61 which is mounted on top of a thin, smooth, stainless steel sheet 63. A film of moly grease 65 is disposed between the polyethylene and the stainless steel plates providing a very slippery interface between the polyethylene and the stainless steel whereby the support cradle can be easily moved, even when loaded, for proper centering under the load.

Thus, it will be apparent from the foregoing description of the invention, in its preferred form, that it will fulfill all the objects and advantages attributable thereto. While it is illustrated and described in considerable detail herein, the invention is not to be limited to such details as have been set forth except as may been necessitated by the appended claims.

We claim:

1. A support cradle for load equalization including
   a lower base member having a pair of cylindrical cribs secured thereto,
   multiple layers of fabreeka secured to metal plate separators and disposed in said cribs and having the lateral edges thereof constrained by said crib when said material is put under compression,
   a load bearing upper member having a pair of cylindrical pistons secured thereto formed for fitting into said crib in closely fitting relation for bearing on said fabreeka layers,
   safety blocks formed for preventing excessive loading of the fabreeka by limiting penetration of the pistons on the upper load bearing member into the cribs formed on the lower base member, and
   wedge means for lifting said cradle vertically including a tapered surface on the bottom surface of said base member and guide means disposed at the edges thereof proximate the center of the base member.

2. The support cradle of claim 1 wherein the wedge means includes a first center guide secured to the bottom surface of said base member and a pair of wedges which are driven under said base member between said edge guide means and separated by said center guide means.

3. The support cradle of claim 2 including a wedge guide plate disposed under said base member and formed for receiving the wedges and including pairs of wedge guides disposed at the edges thereof at both ends of said guide plate and a second center wedge guide disposed proximate the middle thereof for engaging said first center wedge guide when said wedges are driven under said base member to prevent movement of said base member relative to said guide plate, the wedge guides disposed at the end of said plate where the wedges commence their movement under the lower base member being provided with locking means preventing the wedges from retraction movement.

4. The support cradle of claim 1 including a centering means including a pair of flat steel plates supporting said cradle, said plates being separated by a sheet of ultra high molecular weight polyethylene mounted on top of a thin, smooth, stainless steel sheet with a film of moly grease between the polyethylene and stainless steel sheets.

5. A support cradle for load equalization including
   a lower base member having a pair of cylindrical cribs secured thereto at opposite ends thereof,
   a multiple of equal numbers of cylindrical layers of fabreeka disposed in said cribs, said layers being secured to a multiple of circular metal plate separators and constrained by said cribs when said material is put under compression,
   a load bearing upper member having a pair of cylindrical pistons secured thereto formed for fitting into said cribs in closely fitting relation for bearing on said fabreeka layers,
   safety blocks secured to said lower base member and said upper load bearing member and formed for preventing excessive loading of the fabreeka by limiting movement of the pistons into said cribs,
   wedge means for lifting said cradle vertically including
   a tapered surface on the bottom surface of said base member,
   guide means disposed at the edges thereof proximate the center of the base member,
   a first center guide secured to the bottom surface of said base member,
   a pair of wedges which are capable of being driven under said base member between said edge guide means and separated by said center guide means,
   a wedge guide plate disposed under said base member and formed for receiving said wedges and including pairs of wedge guides disposed at the edges thereof at both ends of said guide plate and a second center wedge guide disposed proximate the center thereof and formed for engaging said first center wedge guide when said wedges are driven under said base member to prevent movement of said base member relative to said guide plate, the wedge guides disposed at the end of said plate where the wedges commence their movement under the lower base member being provided with locking means preventing the wedge from retraction movement, and
   a centering means including a pair of flat steel plates supporting said cradle under said wedge means, said plates being separated by a sheet of ultra high molecular weight polyethylene mounted on top of a thin, smooth, stainless steel sheet with a film of moly grease between the polyethylene and stainless steel sheets.

* * * * *